(12) United States Patent
Kawate et al.

(10) Patent No.: US 10,833,298 B2
(45) Date of Patent: Nov. 10, 2020

(54) ENERGY STORAGE DEVICE

(71) Applicant: GS Yuasa International Ltd., Kyoto (JP)

(72) Inventors: Kenji Kawate, Kyoto (JP); Takeshi Kawahara, Ritto (JP); Tomoko Nishikawa, Ritto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 15/760,940

(22) PCT Filed: Sep. 16, 2016

(86) PCT No.: PCT/JP2016/077538
§ 371 (c)(1),
(2) Date: Mar. 16, 2018

(87) PCT Pub. No.: WO2017/047784
PCT Pub. Date: Mar. 23, 2017

(65) Prior Publication Data
US 2018/0261806 A1    Sep. 13, 2018

(30) Foreign Application Priority Data
Sep. 18, 2015   (JP) .................................. 2015-186085

(51) Int. Cl.
*H01M 2/04*   (2006.01)
*H01M 2/18*   (2006.01)
(Continued)

(52) U.S. Cl.
CPC .............. *H01M 2/04* (2013.01); *H01G 11/76* (2013.01); *H01G 11/80* (2013.01); *H01G 11/82* (2013.01);
(Continued)

(58) Field of Classification Search
CPC ............. H01M 10/04; H01M 10/0431; H01M 10/0468; H01M 10/052; H01M 10/0525;
(Continued)

(56) References Cited

U.S. PATENT DOCUMENTS

| 7,709,143 | B2 * | 5/2010 | Lee .......................... H01M 2/14 429/208 |
| 2011/0104540 | A1 * | 5/2011 | Lee .......................... H01M 2/14 429/94 |

(Continued)

FOREIGN PATENT DOCUMENTS

| JP | 2011-216239 A | 10/2011 |
| JP | 2013-054900 A | 3/2013 |

(Continued)

*Primary Examiner* — Victoria H Lynch
(74) *Attorney, Agent, or Firm* — McGinn I.P. Law Group, PLLC.

(57) ABSTRACT

An energy storage device includes an electrode body in which an electrode is wound, a case that stores the electrode body, and spacers (side spacers) interposed between the case and the electrode body. The spacers each have an opening that exposes a portion of faces of curved portions of the electrode body from one end to the other end of the electrode body in a winding axis direction of the electrode body.

16 Claims, 16 Drawing Sheets

(51) Int. Cl.
| | |
|---|---|
| *H01M 10/04* | (2006.01) |
| *H01M 2/02* | (2006.01) |
| *H01M 2/14* | (2006.01) |
| *H01G 11/82* | (2013.01) |
| *H01G 11/80* | (2013.01) |
| *H01G 11/76* | (2013.01) |
| *H01M 6/02* | (2006.01) |
| *H01M 2/08* | (2006.01) |
| *H01M 2/30* | (2006.01) |
| *H01M 10/0525* | (2010.01) |
| *H01G 11/78* | (2013.01) |
| *H01M 10/052* | (2010.01) |

(52) U.S. Cl.
CPC ............ *H01M 2/024* (2013.01); *H01M 2/08* (2013.01); *H01M 2/14* (2013.01); *H01M 2/18* (2013.01); *H01M 2/30* (2013.01); *H01M 6/02* (2013.01); *H01M 10/04* (2013.01); *H01M 10/0431* (2013.01); *H01M 10/0468* (2013.01); *H01M 10/0525* (2013.01); *H01G 11/78* (2013.01); *H01M 10/052* (2013.01); *H01M 2220/20* (2013.01)

(58) Field of Classification Search
CPC .... H01M 2220/20; H01M 2/024; H01M 2/04; H01M 2/08; H01M 2/14; H01M 2/18; H01M 2/30; H01M 6/02
See application file for complete search history.

(56) References Cited

U.S. PATENT DOCUMENTS

| | | | |
|---|---|---|---|
| 2013/0004824 A1 | 1/2013 | Naganawa et al. | |
| 2014/0212715 A1* | 7/2014 | Kim | H01M 10/0468 429/94 |
| 2017/0324070 A1* | 11/2017 | Toshiro | H01M 2/028 |

FOREIGN PATENT DOCUMENTS

| | | |
|---|---|---|
| JP | 2013-152916 A | 8/2013 |
| JP | 2015-053129 A | 3/2015 |

* cited by examiner

ENERGY STORAGE DEVICE

TECHNICAL FIELD

The present invention relates to an energy storage device.

BACKGROUND ART

A conventional energy storage device includes an electrode body stored in a case via a spacer (Refer to Patent Document 1, for example).

PRIOR ART DOCUMENT

Patent Document

Patent Document 1: JP-A-2011-96660

SUMMARY OF THE INVENTION

Problems to be Solved by the Invention

In recent years, an increase in the capacity of energy storage devices has been demanded. However, to increase the capacity, the conventional energy storage device needs upsizing. Incidentally, upsizing of the case does not make an electrode body large by the thickness of a spacer.

An object of the present invention is to provide an energy storage device capable of increasing the capacity while suppressing upsizing of the energy storage device, in consideration of the conventional problem.

Means for Solving the Problems

To attain the object, an energy storage device in accordance with one aspect of the present invention includes an electrode body in which an electrode is wound, a case configured to store the electrode body; and a spacer interposed between the case and the electrode body. The spacer has an opening configured to expose a portion of a face of a curved portion of the electrode body from one end to the other end of the electrode body in a winding axis direction of the electrode body.

Advantages of the Invention

According to the present invention, the capacity of the energy storage device can be increased while suppressing upsizing of the energy storage device.

MODE FOR CARRYING OUT THE INVENTION

Figure 1:
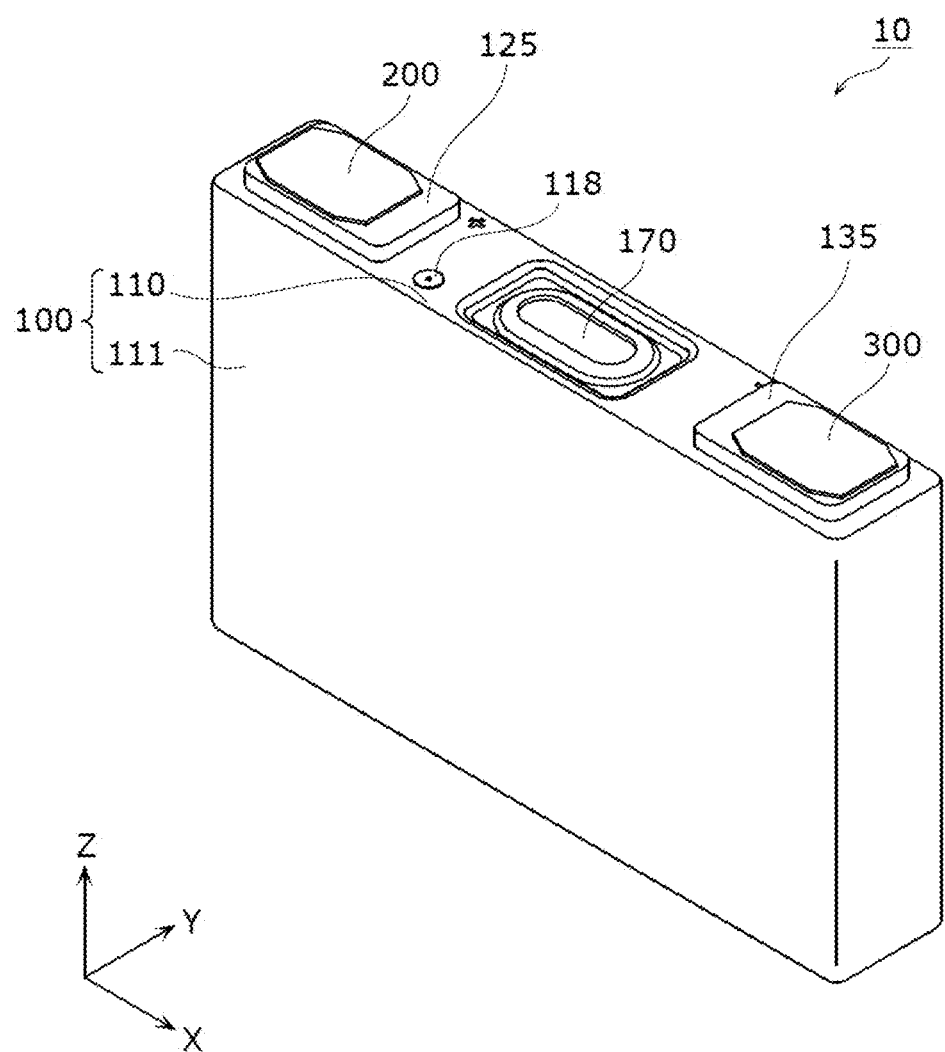
FIG. 1 is a perspective view illustrating the outer appearance of an energy storage device in accordance with an embodiment.

To attain the object, an energy storage device in accordance with one aspect of the present invention includes an electrode body in which an electrode is wound, a case configured to store the electrode body; and a spacer interposed between the case and the electrode body. The spacer has an opening configured to expose a portion of a face of a curved portion of the electrode body from one end to the other end of the electrode body in a winding axis direction of the electrode body.

With this configuration, since the opening of the spacer exposes the portion of the face of the curved portion of the electrode body from one end to the other end of the electrode body in a winding axis direction of the electrode body, the electrode body can be disposed in the opening. Therefore, a space for the electrode body can be extended, and without upsizing of the entire energy storage device, the outer shape of the electrode body can be increased to increase the capacity.

In the energy storage device in accordance with another aspect of the present invention, the portion of the face of the curved portion of the electrode body may be disposed in the opening.

With this configuration, since the portion of the face of the electrode body is disposed in the opening, space for the electrode body can be extended to the inside of the opening. Therefore, the outer shape of the electrode body can be increased.

In the energy storage device in accordance with another aspect of the present invention, the portion of the face of the electrode body may be flush with the outer face of the spacer.

With this configuration, since the portion of the face of the electrode body, which is exposed through the opening, is flush with the outer face of the spacer, the entire opening can be used as the space for the electrode body. Therefore, the outer shape of the electrode body can be increased to increase the capacity of the energy storage device.

In the energy storage device in accordance with another aspect of the present invention, the electrode body may be an ellipse having two curved portions, and the spacer may be provided on each of the two curved portions.

With this configuration, since the elliptical electrode body is provided with the spacer on each of the two curved portions, the spacer can be produced with simple structure.

In the energy storage device in accordance with another aspect of the present invention, the electrode body may be disposed such that one end of the electrode body in the winding axis direction is opposed to a cover plate of the case.

With this configuration, since the electrode body is disposed such that the one end of the electrode body in the winding axis direction is opposed to the cover plate of the case, the so-called laterally-wound electrode body can increase the capacity. The spacer is disposed between the case and the electrode body so as to cross the principal face of the cover plate and thus, can be used as guides when the electrode body is stored in the case, smoothly guiding the electrode body into the case.

In the energy storage device in accordance with another aspect of the present invention, the case may have a rectangular storage recess when viewed in the winding axis direction, and the spacer may be disposed along a side face forming a short side of the storage recess.

With this configuration, since the spacer is disposed along the side face forming the short side of the storage recess, as compared with the case where the spacer is disposed along a side face forming a long side of the storage recess, the spacer can be reduced in size. Consequently, a larger space for the electrode body can be ensured to enlarge the outer shape of the electrode body.

In the energy storage device in accordance with another aspect of the present invention, the portion of the face of the curved portion may include an apex of the curved portion.

With this configuration, since the portion of the face of the curved portion, which is exposed through the opening, includes the apex of the curved portion, the portion of the face of the curved portion can be readily disposed in the opening.

An energy storage device in accordance with an embodiment of the present invention will be described below with reference to the drawings. Each drawing is schematic, and does not accurately illustrate each component.

The below-mentioned embodiment provides a specific example of the present invention. Shape, material, components, arrangement and connection of the components, and order of manufacturing steps in the embodiment are only examples, and do not intend to limit the present invention. The components that are not recited in dependent claims representing the most superordinate concept among the components in the embodiment are described as optional components.

First, with reference to FIG. 1 to FIG. 3, an energy storage device 10 in accordance with the embodiment will be generally described below.

FIG. 1 is a perspective view illustrating the outer appearance of an energy storage device 10 in accordance with the embodiment. FIG. 2 is an exploded perspective view illustrating the energy storage device 10 in accordance with the embodiment. FIG. 3 is an exploded perspective view illustrating a cover plate structure 180 in the embodiment. In FIG. 3, a positive electrode lead plate 145 bonded to a positive electrode current collector 140 and a negative electrode lead plate 155 bonded to a negative electrode current collector 150 in the cover plate structure 180 are expressed by broken lines.

In FIG. 1 and subsequent figures, for convenience of description, a Z-axis direction is defined as a vertical direction. However, in actual use modes, the Z-axis direction may be inconsistent with the vertical direction.

The energy storage device 10 is a secondary battery capable of charging and discharging electricity. Specifically, the energy storage device 10 is a nonaqueous electrolyte secondary battery such as a lithium ion secondary battery. The energy storage device 10 is applied to, for example, electric cars (EVs), hybrid electric cars (HEVs), and plug-in hybrid electric cars (PHEVs). The energy storage device 10 is not limited to the nonaqueous electrolyte secondary battery, and may be any secondary battery other than the nonaqueous electrolyte secondary battery, or a capacitor.

Figure 2:
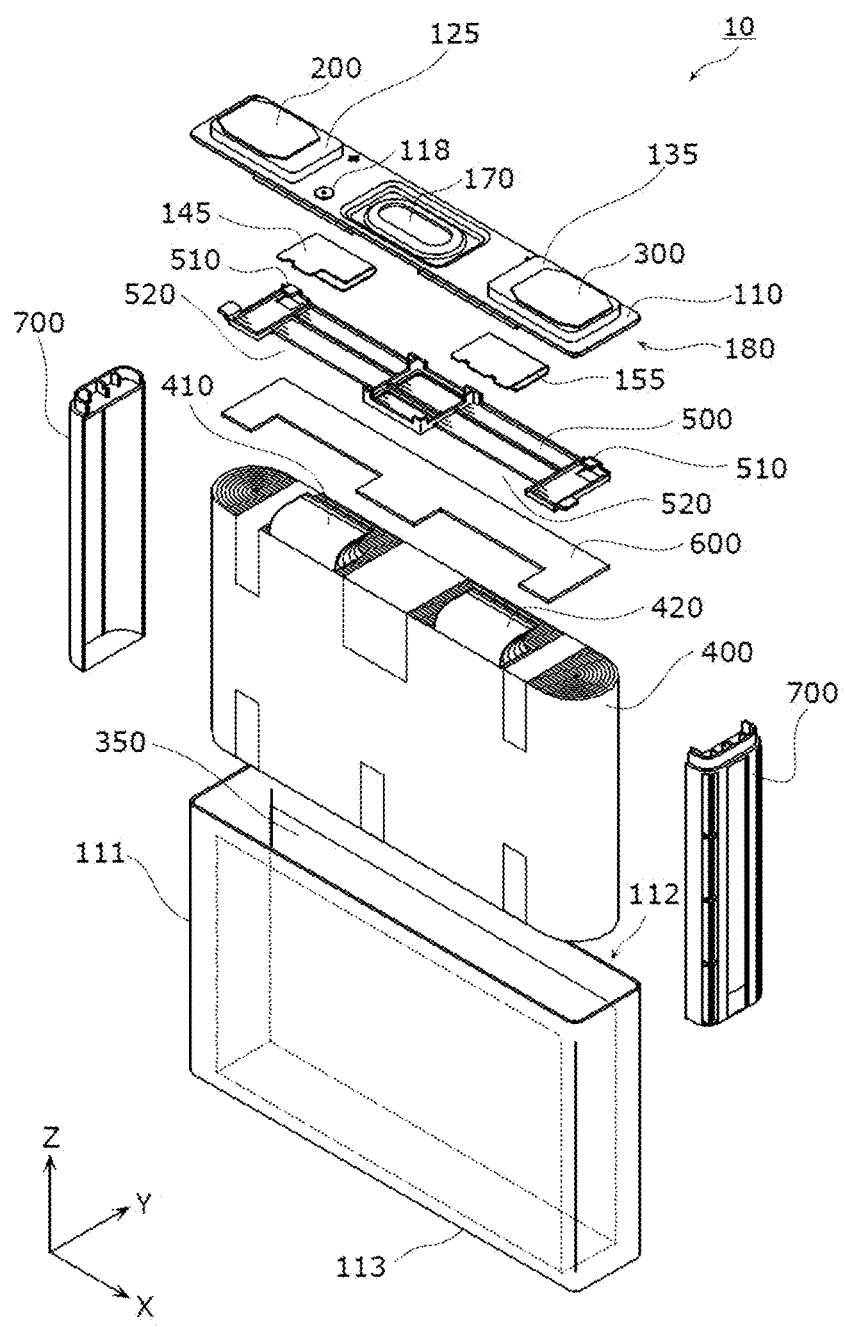
FIG. 2 is an exploded perspective view illustrating the energy storage device in accordance with the embodiment.

As illustrated in FIG. 1 and FIG. 2, the energy storage device 10 includes an electrode body 400, and a case 100 that stores the electrode body 400. In this embodiment, the cover plate structure 180 configured by disposing various components on a cover plate 110 of the case 100 is disposed above the electrode body 400. In the case 100, one end of the electrode body 400 is opposed to the cover plate structure 180.

The cover plate structure 180 has the cover plate 110 of the case 100, a positive electrode terminal 200, a negative electrode terminal 300, upper insulating members 125 and 135, lower insulating members 120 and 130, the positive electrode current collector 140, and the negative electrode current collector 150.

The positive electrode terminal 200 is electrically connected to a positive electrode of the electrode body 400 via the positive electrode current collector 140, and the negative electrode terminal 300 is electrically connected to a negative electrode of the electrode body 400 via the negative electrode current collector 150. Each of the conductive members electrically connected to the electrode body 400, including the positive electrode terminal 200, is insulated from the case 100 by the insulating member such as the lower insulating member 120.

The upper insulating members 125 and 135, and the lower insulating members 120 and 130 each are an insulating member at least partially disposed between a wall of the case 100 and the conductive member. In this embodiment, each of the insulating members are disposed along the cover plate 110 that forms an upper wall among six walls forming the substantially rectangular parallelepiped-shaped case 100.

This energy storage device 10 in accordance with the embodiment has, in addition to the above components, an upper spacer 500 and a cushioning sheet 600, which are disposed between the cover plate structure 180 and the electrode body 400.

The upper spacer 500 has locking portions 510 that are disposed between the electrode body 400 and the cover plate 110, and each are locked at a portion of the cover plate structure 180.

Specifically, the upper spacer 500 is a flat plate as a whole, and has two locking portions 510, and two inserting portions 520 into which tabs 410 and 420 are inserted (through which the tabs 410 and 420 pass). In this embodiment, the inserting portions 520 are notches in the upper spacer 500. The upper spacer 500 is made of an insulating material such as polycarbonate (PC), polypropylene (PP), polyethylene (PE), or polyphenylene sulfide resin (PPS).

The upper spacer 500 functions as a member for directly or indirectly limiting upward movement of the electrode body 400 (toward the cover plate 110), or for preventing short circuit between the cover plate structure 180 and the electrode body 400. The upper spacer 500 has the two locking portions 510, and each of the two locking portions 510 is locked by an attachment portion 122 or 132 of the cover plate structure 180.

The cushioning sheet 600 is a highly-flexible and porous material such as foamed polyethylene, and functions as a cushioning material between the electrode body 400 and the upper spacer 500.

In this embodiment, side spacers 700 are disposed between side faces of the electrode body 400, which are located in the direction crossing the aligning direction (Z-axis direction) of the electrode body 400 and the cover plate 110, (that is, both side faces located in the X-axis direction in this embodiment) and the inner face of the case 100. The side spacers 700 functions to limit the position of the electrode body 400, for example. Specific structure of the side spacers 700 will be described later.

Figure 3:
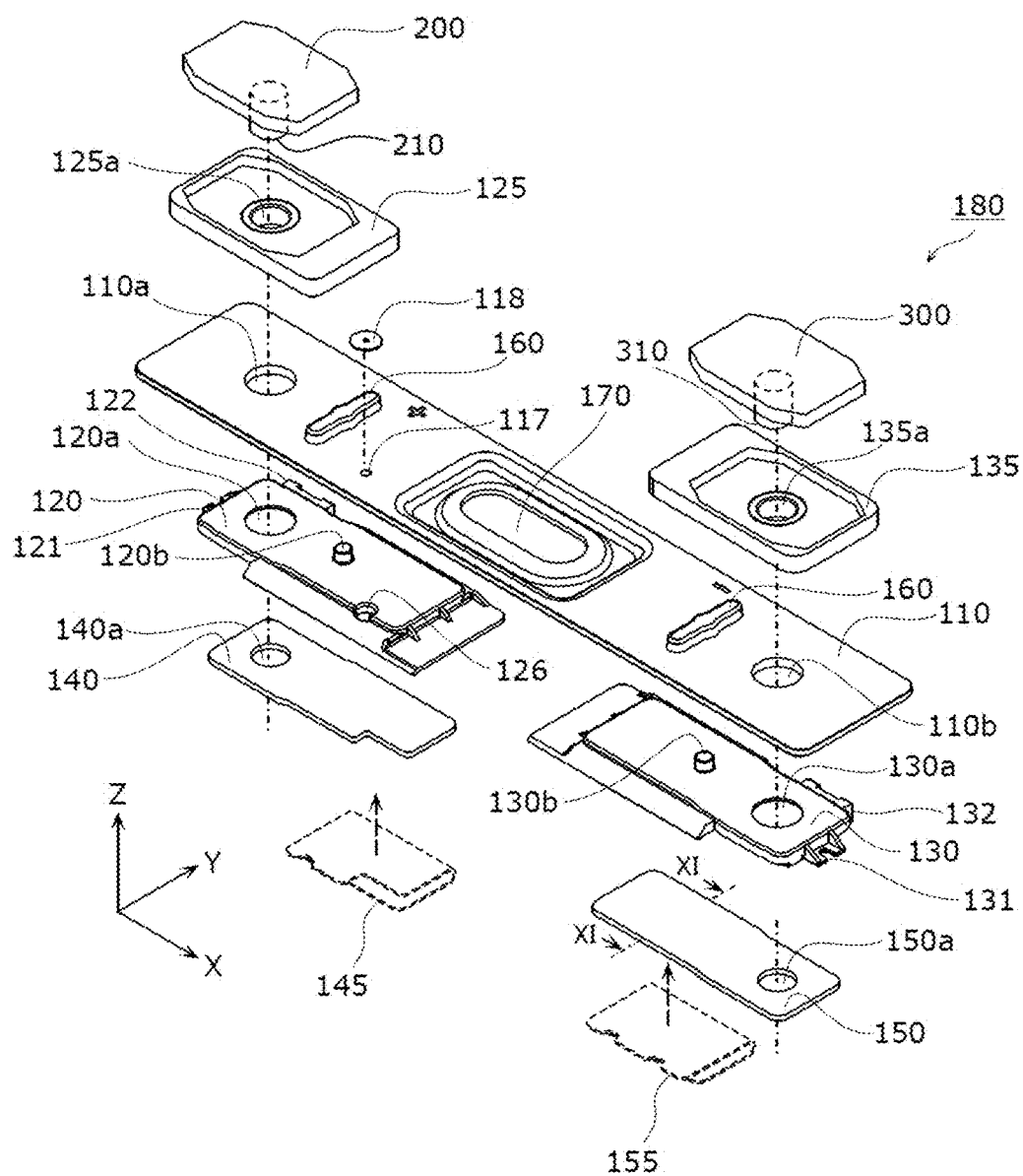
FIG. 3 is an exploded perspective view illustrating a cover plate structure in accordance with the embodiment.

The energy storage device 10 may further include, in addition to the components illustrated in FIG. 1 to FIG. 3, another component such as a cushioning sheet disposed between the electrode body 400 and a bottom 113 of the case 100 (main body 111). An electrolyte solution (nonaqueous electrolyte) is filled in the case 100 of the energy storage device 10, and is not illustrated.

The case 100 includes the main body 111 and the cover plate 110. The material for the main body 111 and the cover plate 110 is not specifically limited, but is preferably, weldable metal such as stainless steel, aluminum, and aluminum alloy.

The main body 111 is a rectangular tube in a top view, and includes a rectangular storage recess 112 in a top view and the bottom 113. An insulating sheet 350 that covers the electrode body 400 is provided in the main body 111.

The electrode body 400, the insulating sheet 350, and so on are stored in the storage recess 112 and then, the cover plate 110 is welded to the main body 111 to seal the main body.

The cover plate 110 is a plate member which closes an opening of the storage recess 112. As illustrated in FIG. 2 and FIG. 3, the cover plate 110 has a safety valve 170, an electrolyte solution filling port 117, through holes 110a and 110b, and two expanding portions 160. The safety valve 170 is opened when the internal pressure of the case 100 rises to discharge gas in the case 100.

The electrolyte solution filling port 117 is a through hole for filling an electrolyte solution during manufacturing of the energy storage device 10. As illustrated in FIG. 1 to FIG. 3, the cover plate 110 is provided with an electrolyte solution filling plug 118 that closes the electrolyte solution filling port 117. That is, during manufacturing of the energy storage device 10, the electrolyte solution is filled into the case 100 through the electrolyte solution filling port 117, and the electrolyte solution filling plug 118 is welded to the cover plate 110 to close the electrolyte solution filling port 117, such that the electrolyte solution is stored in the case 100.

Any type of electrolyte solution filled in the case 100 may be used unless it impairs performances of the energy storage device 10.

In this embodiment, the cover plate 110 partially expands to form each of the two expanding portions 160, which is used to position the upper insulating member 125 or 135. A concave recess (not shown) is formed on the back side of each expanding portion 160 (the side opposed to the electrode body 400), and a portion of the recess engages with an engaging projection 120b or 130b of the lower insulating member 120 or 130. Thereby, the lower insulating member 120 or 130 is positioned, and is fixed to the cover plate 110 in this state.

The upper insulating member 125 electrically insulates the positive electrode terminal 200 from the cover plate 110. The lower insulating member 120 electrically insulates the positive electrode current collector 140 from the cover plate 110. The upper insulating member 135 electrically insulates the negative electrode terminal 300 from the cover plate 110. The lower insulating member 130 electrically insulates the negative electrode current collector 150 from the cover plate 110. The upper insulating members 125 and 135 may be also referred to as upper packing, and the lower insulating members 120 and 130 may be also referred to as lower packing. That is, in this embodiment, the upper insulating members 125 and 135, and the lower insulating members 120 and 130 also function to seal the section between the electrode terminal (200 or 300) and the case 100.

Like the upper spacer 500, the upper insulating members 125 and 135, and the lower insulating members 120 and 130 are made of an insulating material such as PC, PP, PE, or PPS. A through hole 126 that guides the electrolyte solution to the electrode body 400 through the electrolyte solution filling port 117 is provided in the lower insulating member 120 immediately below the electrolyte solution filling port 117.

The lower insulating members 120 and 130 are provided with engaging portions 121 and 131, respectively, engaging with the respective side spacers 700. Specifically, the engaging portions 121 and 131 protrude from one outer ends of the lower insulating members 120 and 130, respectively. The engaging portions 121 and 131 engage with the respective side spacers 700 to position the lower insulating members 120 and 130 with respective to the side spacers 700. This, in turn, positions the cover plate structure 180 with respect to the side spacers 700. The engaging state between the engaging portions 121 and 131 and the side spacers 700 will be described later.

As illustrated in FIG. 1 to FIG. 3, the positive electrode terminal 200 is electrically connected to the positive electrode of the electrode body 400 via the positive electrode current collector 140. The negative electrode terminal 300 is electrically connected to the negative electrode of the electrode body 400 via the negative electrode current collector 150. That is, the positive electrode terminal 200 and the negative electrode terminal 300 are metal electrode terminals that lead electricity stored in the electrode body 400 to an external space of the energy storage device 10, and introduce electricity into an internal space of the energy storage device 10 to store electricity in the electrode body 400. The positive electrode terminal 200 and the negative electrode terminal 300 are made of aluminum or aluminum alloy.

The positive electrode terminal 200 is provided with a fastening portion 210 that fastens the case 100 to the positive electrode current collector 140. The negative electrode terminal 300 is provided with a fastening portion 310 that fastens the case 100 to the negative electrode current collector 150.

The fastening portion 210 is a member (rivet) extending downward from the positive electrode terminal 200, and is inserted into a through hole 140a of the positive electrode current collector 140 and is caulked. Specifically, the fastening portion 210 is inserted into a through hole 125a of the upper insulating member 125, a through hole 110a of the cover plate 110, a through hole 120a of the lower insulating member 120, and the through hole 140a of the positive electrode current collector 140, and is caulked. As a result, the positive electrode terminal 200 is electrically connected to the positive electrode current collector 140, and the positive electrode current collector 140 along with the positive electrode terminal 200, the upper insulating member 125, and the lower insulating member 120 is fixed to the cover plate 110.

The fastening portion 310 is a member (rivet) extending downward from the negative electrode terminal 300, and is inserted into a through hole 150a of the negative electrode current collector 150, and is caulked. Specifically, the fastening portion 310 is inserted into a through hole 135a of the upper insulating member 135, a through hole 110b of the cover plate 110, a through hole 130a of the lower insulating member 130, and the through hole 150a of the negative electrode current collector 150. The negative electrode terminal 300 is electrically connected to the negative electrode current collector 150, and the negative electrode current collector 150 along with the negative electrode terminal 300, the upper insulating member 135, and the lower insulating member 130 is fixed to the cover plate 110.

The fastening portion 210 may be integral with the positive electrode terminal 200, or the fastening portion 210 manufactured as a separate component may be fixed to the positive electrode terminal 200 by caulking, welding, or any other suitable means. The same also applies to the relation between the fastening portion 310 and the negative electrode terminal 300.

The positive electrode current collector 140 is disposed between the electrode body 400 and the case 100, and electrically connects the electrode body 400 to the positive electrode terminal 200. The positive electrode current collector 140 is made of aluminum or aluminum alloy. In this embodiment, the positive electrode current collector 140 is electrically connected to the tab 410 on the side of the positive electrode of the electrode body 400 via the positive electrode lead plate 145. Like the positive electrode current collector 140, the positive electrode lead plate 145 is made of aluminum or aluminum alloy.

The negative electrode current collector 150 is disposed between the electrode body 400 and the case 100, and electrically connects the electrode body 400 to the negative electrode terminal 300. The negative electrode current collector 150 is made of copper or copper alloy. In this embodiment, the negative electrode current collector 150 is electrically connected to the tab 420 on the side of the negative electrode of the electrode body 400 via the negative electrode lead plate 155. Like the negative electrode current collector 150, the negative electrode lead plate 155 is made of copper or copper alloy.

Details of the connecting portion between the current collector and the tab via the lead plate will be described later.

Next, the configuration of the electrode body 400 will be described with reference to FIG. 4.

Figure 4:
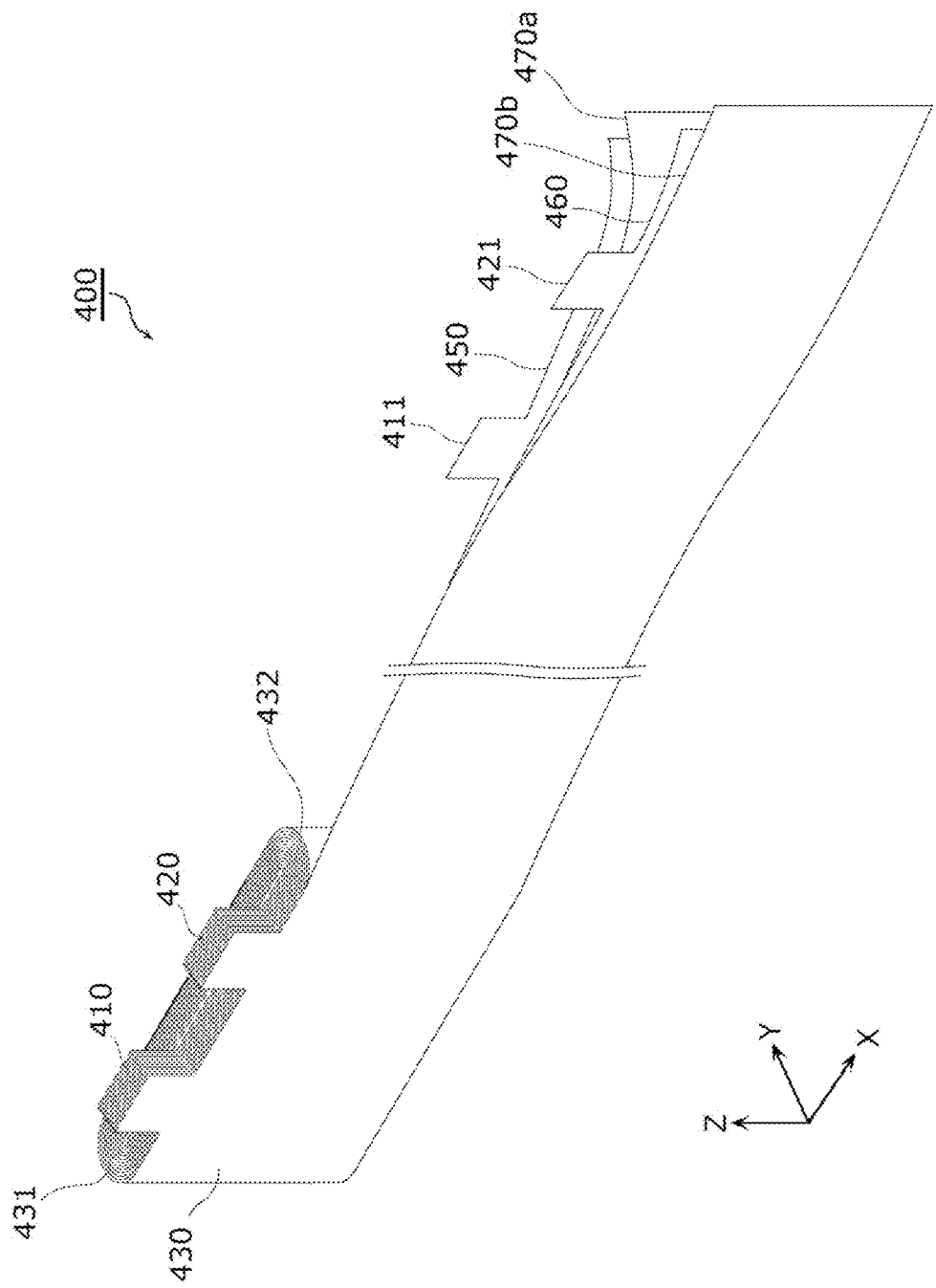
FIG. 4 is a perspective view illustrating the configuration of an electrode body in accordance with the embodiment.

FIG. 4 is a perspective view illustrating the configuration of the electrode body 400 in accordance with the embodiment. FIG. 4 is a partially unwound view illustrating the winding state of the electrode body 400.

The electrode body 400 is a power generating element capable of storing electricity. The electrode body 400 is formed by stacking and winding a positive electrode 450, a separator 470a, a negative electrode 460, and a separator 470b. That is, electrode body 400 is formed by stacking the positive electrode 450, the separator 470a, the negative electrode 460, and the separator 470b in this order to have an elliptical cross section.

The positive electrode 450 is an electrode plate in which a positive active material layer is formed on the surface of a positive electrode substrate layer that is a long band-like metal foil made of aluminum or aluminum alloy. The positive active material for the positive active material layer may be any well-known positive active material capable of occluding and ejecting lithium ions. Examples of the positive active material include polyanion compound such as $LiMPO_4$, $LiMSiO_4$, and $LiMBO_3$ (M is one or two or more types of transition metal elements selected from Fe, Ni, Mn, Co, and so on), spinel compound such as lithium titanate and lithium manganese oxide, and lithium transition metal oxide such as $LiMO_2$ (M is one or two or more types of transition metal elements selected from Fe, Ni, Mn, Co, and so on).

The negative electrode 460 is an electrode plate in which a negative active material layer is formed on the surface of a negative electrode substrate layer that is a long band-like metal foil made of copper or copper alloy. The negative active material for the negative active material layer may be any well-known negative active material capable of occluding and ejecting lithium ions. Examples of the negative active material include lithium metal, lithium alloy (lithium-containing alloy such as lithium-aluminum, lithium-lead, lithium-tin, lithium-aluminum-tin, lithium-gallium, and Wood's alloy), alloy capable of occluding and ejecting lithium, carbon material (for example, graphite, hardly graphitized carbon, easy graphitized carbon, low-temperature baked carbon, amorphous carbon), metal oxide, lithium metal oxide (ex. $Li_4Ti_5O_{12}$), and polyphosphoric acid compound.

The separators 470a and 470b are microporous sheet made of resin. The material for the separators 470a and 470b used in the energy storage device 10 may be any well-known material unless it impairs performances of the energy storage device 10.

The positive electrode 450 has a plurality of protruding portions 411 protruding outward at one end of the winding axis direction. Similarly, the negative electrode 460 has a plurality of protruding portions 421 protruding outward at one end of the winding axis direction. The plurality of protruding portions 411 and the plurality of protruding portions 421 are portions that are not coated with the active material and leave the substrate layer exposed (active material-uncoated portion).

The winding axis is a virtual axis used as a central axis around which the positive electrode 450 and the negative electrode 460 is wound, and in this embodiment, the winding axis is a straight line parallel to the Z-axis direction that passes the center of the electrode body 400.

The protruding portions 411 and the protruding portions 421 are disposed at the same end of the winding axis direction (end on the positive side of the Z-axis direction in FIG. 4). The positive electrode 450 and the negative electrode 460 are stacked and thus, the protruding portions 411 and the protruding portions 421 are stacked at predetermined positions in the electrode body 400. Specifically, the positive electrode 450 is stacked by being wound, such that the plurality of protruding portions 411 are stacked at a predetermined circumferential position at one end of the winding axis direction. The negative electrode 460 is stacked by being wound, such that the plurality of protruding portions 421 are stacked at a predetermined circumferential position other than the position where the protruding portions 411 are stacked, at the one end of the winding axis direction.

As a result, the electrode body 400 is provided with the tab 410 formed by stacking the plurality of protruding portions 411 and the tab 420 formed by stacking the plurality of protruding portions 421. The tab 410 is collected toward the center of the stacking direction, and is bonded to the positive electrode lead plate 145, for example, by ultrasonic welding. The tab 420 is collected toward the center of the stacking direction, and is bonded to the negative electrode lead plate 155, for example, by ultrasonic welding. The positive electrode lead plate 145 bonded to the tab 410 is bonded to the positive electrode current collector 140, and the positive electrode lead plate 145 bonded to the tab 420 is bonded to the negative electrode current collector 150.

The tabs (410, 420) introduce electricity in and lead electricity out the electrode body 400, and may be also referred to as "lead (portion)" and "current collecting portion".

The tab 410 is formed by stacking the protruding portions 411 that leave the substrate layer exposed and thus, does not contribute to power generation. Similarly, the tab 420 is formed by stacking the protruding portions 421 that leave the substrate layer exposed and thus, does not contribute to power generation. On the contrary, the portion of the electrode body 400 except for the tabs 410 and 420 is formed by stacking the portions coated with the active material on the substrate layer and thus, contributes to power generation. The portion will be hereinafter referred to as a main body 430. Both ends of the main body 430 in the X-axis direction become curved portions 431 and 432 each having a curved outer circumferential face. In this manner, the electrode body 400 is shaped like an ellipse having the two curved portions 431 and 432.

Figure 9:
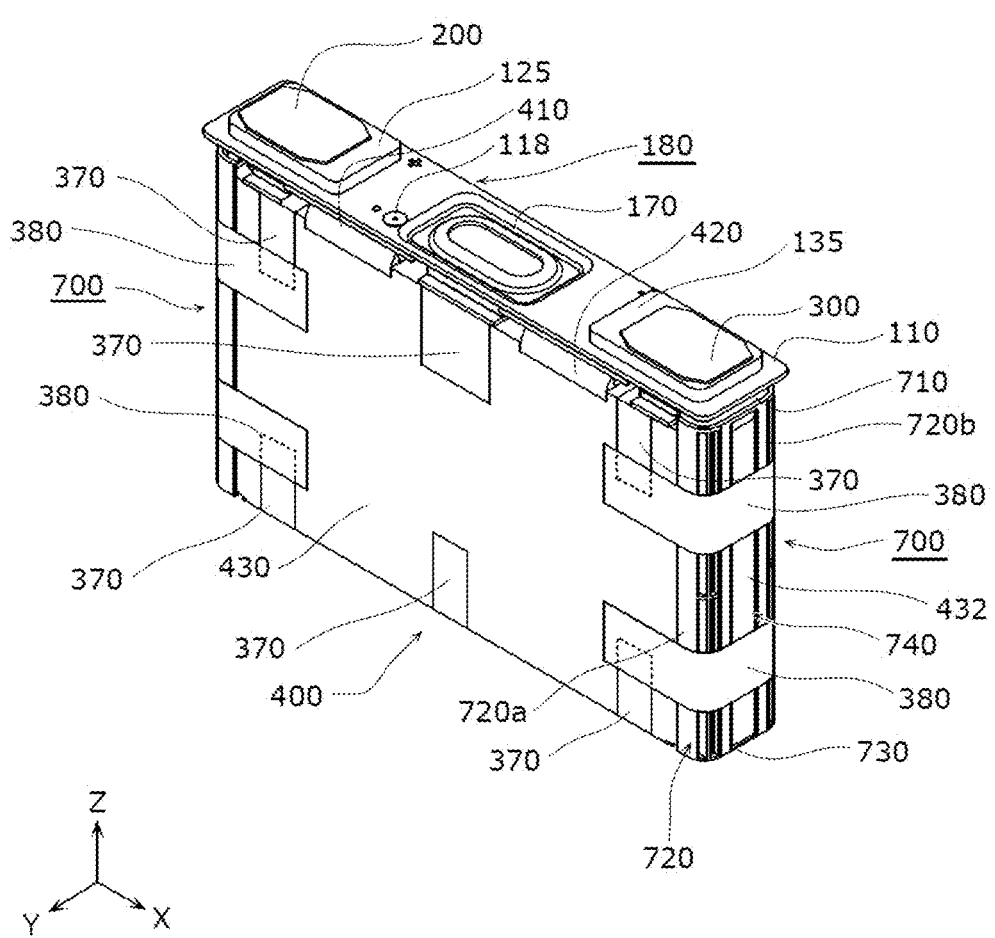
FIG. 9 is a perspective view illustrating the assembled state of the side spacers and the electrode body in accordance with the embodiment.

Three adhesive tapes 370 are attached to each of one end and the other end of the main body 430 in the winding axis direction (Z-axis direction) to prevent winding deviation (See FIG. 9).

Figure 5:
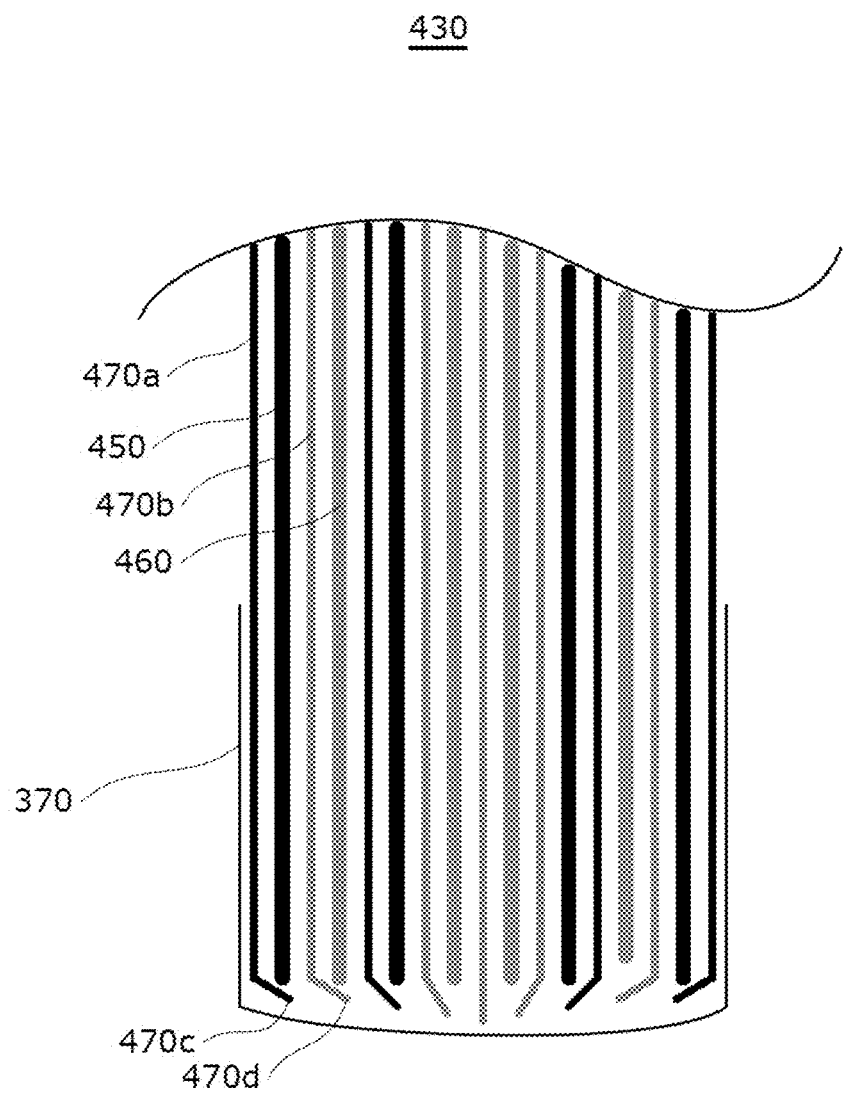
FIG. 5 is a sectional view schematically illustrating the adhesion state of the adhesive tape to the main body of the electrode body in accordance with the embodiment.

FIG. 5 is a sectional view schematically illustrating the adhesion state of the adhesive tape 370 to the main body 430 of the electrode body 400 in accordance with the embodiment.

FIG. 5 illustrates one adhesive tape 370 adhered to the lower end of the main body 430, and the positive electrode 450, the negative electrode 460, and the separators 470a and 470b that are sandwiched between both ends of the adhesive tape 370. This also applies to the adhesion state of the other adhesive tapes 370 and thus, the description of the adhesion state is omitted. In FIG. 5, the number of windings of the positive electrode 450, the negative electrode 460, and the separators 470a and 470b does not reflect the actual one, and is illustrated in a simplified manner.

As illustrated in FIG. 5, the ends of the separators 470a and 470b protrude from the positive electrode 450 and the negative electrode 460. The both ends of the adhesive tape 370 is adhered to the outer circumferential face of the main body 430 so as to collect protruding portions 470c and 470d of the separators 470a and 470b toward the center. Thus, even in the place without the adhesive tape 370, the protruding portions 470c and 470d of the separators 470a and 470b close the end of the main body 430, thereby preventing foreign matters from entering the main body 430 while suppressing the winding deviation of the main body 430.

Next, the specific configuration of the side spacers 700 will be described.

Figure 6:
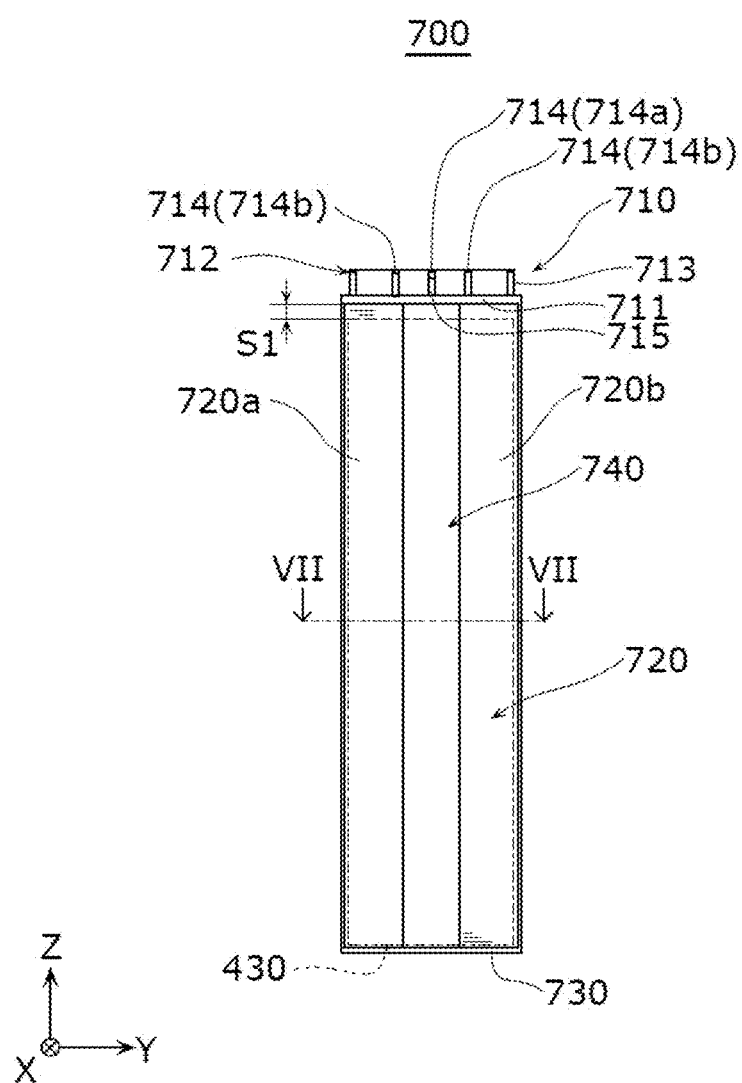
FIG. 6 is a front view illustrating a side spacer in accordance with the embodiment, viewed from the inside.
Figure 7:
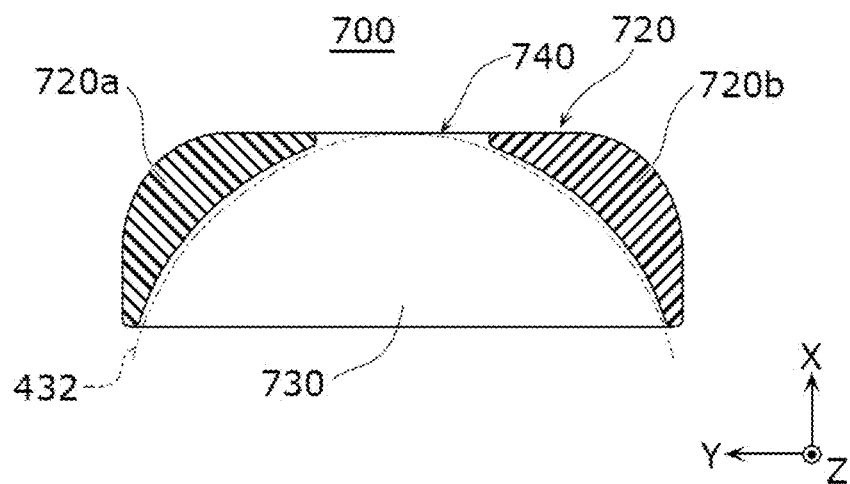
FIG. 7 is a sectional view illustrating a side spacer taken along an XY plane passing a line VII-VII in FIG. 6.
Figure 8:
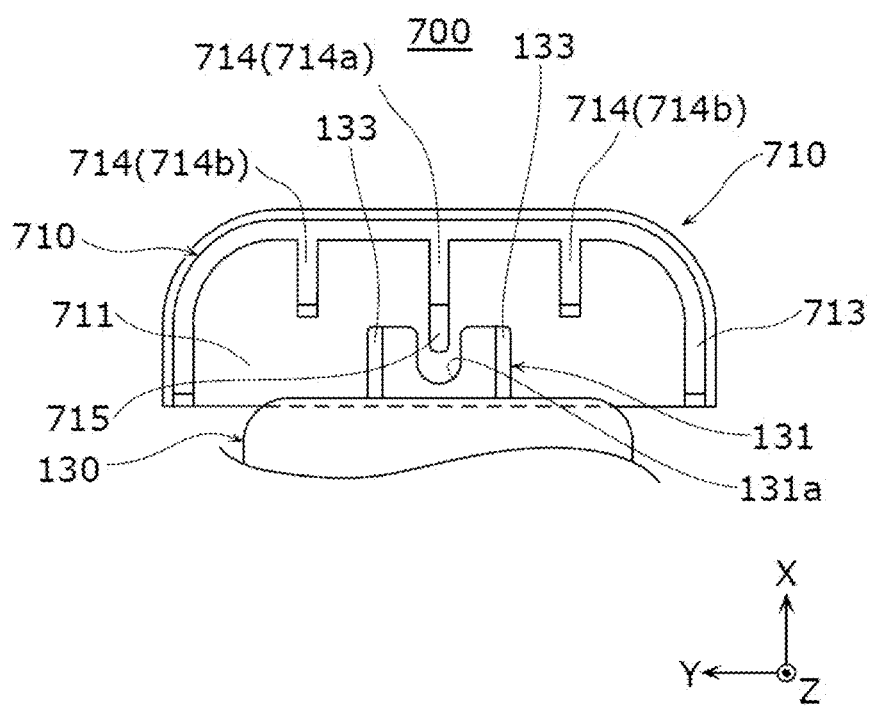
FIG. 8 is a top view illustrating the side spacer in accordance with the embodiment.

FIG. 6 is a front view illustrating the side spacer 700 in accordance with the embodiment when viewed from the inside. FIG. 7 is a sectional view of the side spacer 700 taken along the XY plane passing a line VII-VII in FIG. 6. FIG. 8 is a top view of the side spacer 700 in accordance with the embodiment. In FIG. 6, the outer shape of the main body 430 of the electrode body 400 is expressed by a two-dot chain line. FIG. 8 illustrates the state where the engaging portion 131 of the lower insulating member 130 engages with the side spacer 700. The same also applies to the configuration on the side of the positive electrode and thus, overlapping description is omitted.

As illustrated in FIG. 6 to FIG. 8, the side spacers 700 are long members extending in the winding axis direction (Z-axis direction), and are made of an insulating material such as PC, PP, PE, or PPS. The side spacers 700 each have a base 710, a wall body 720, and a bottom plate 730.

The base 710 has a top plate 711 and a wall portion 712.

The top plate 711 is substantially shaped like a rectangle having round-shaped corners in a top view. The wall portion 712 is formed on the top face of the top plate 711.

The wall portion 712 has a circumferential wall 713 and inner walls 714.

The circumferential wall 713 is opened at a portion corresponding to a side of the top plate 711, and is vertically provided along the other sides of the top plate 711, from the top plate 711. The inner walls 714 are disposed inside of the circumferential wall 713. The three inner walls are vertically provided from the top plate 711 in parallel with each other so that they are connected to the circumferential wall 713, and extend inward. The end face of the circumferential wall 713 is flush with the end faces of the inner walls 714 in the Z-axis direction. Among the three inner walls 714, the centrally-located inner wall 714a is longer than the other two inner walls 714b in the X-axis direction. A front end of the central inner wall 714a is a positioning portion 715 that engages with the engaging portions 121 and 131 of the lower insulating members 120 and 130.

The wall body 720 extends in the Z-axis direction, its one end is coupled to the top plate 711, and the other end is coupled to the bottom plate 730. An opening 740 that opens the wall body 720 is formed at the center of the wall body 720 in the Y-axis direction. The opening 740 is formed in the Z-axis direction from the top plate 711 to the bottom plate 730.

Portions of the wall body 720, which are opposed to each other across the opening 740, are defined as a first wall body 720a and a second wall body 720b. The first wall body 720a and the second wall body 720b have the same shape from one end to the other end in the Z-axis direction. As illustrated in FIG. 7, in the sectional view of the first wall body 720a and the second wall body 720b, their inner faces are smooth concave curved faces, while their outer faces are smooth convex curved faces corresponding to the inner face of the main body 111 of the case 100.

Like the top plate 711, the bottom plate 730 is substantially shaped like a rectangle having round-shaped corners in a top view. The wall body 720 is coupled to the top face of the bottom plate 730.

Next, the state where the side spacers 700 are assembled to the electrode body 400 will be described with reference to FIG. 7 and FIG. 9.

FIG. 9 is a perspective view illustrating the assembled state of the side spacers 700 and the electrode body 400 in accordance with the embodiment.

As illustrated in FIG. 9, the side spacers 700 are individually attached to the curved portions 431 and 432 of the electrode body 400. Specifically, the side spacers 700 are attached to the electrode body 400 such that the curved portions 431 and 432 are stored in the opening 740 from one end to the other end in the winding axis direction.

In FIG. 7, the outer shape of the curved portion 432 is expressed by a two-dot chain line. Since the curved portions 431 and 432 have the almost same outer shape, the positional relation between the side spacers 700 and the curved portion 432 is described herein, and description of the positional relation between the side spacers 700 and the curved portion 431 is omitted. As illustrated in FIG. 7, the side spacer 700 is attached to the electrode body 400 such that the outer face of the wall body 720 is flush with a portion of the face of the curved portion 432. The portion of the face of the curved portion 432 includes the apex of the curved portion 432. Thus, the curved portion 432 is stored in the opening 740 of the side spacer 700. The inner face of the wall body 720 is a concave curved face and thus, contacts the face of the curved portion 432 without deforming the curved face of the curved portion 432 to stabilize the shape of the curved portion 432.

Then, as illustrated in FIG. 9, the side spacers 700 are fixed to the main body 430 of the electrode body 400 with respective adhesive tapes 380. Specifically, the side spacers 700 are fixed to the main body 430 at two positions with a predetermined distance in the Z-axis direction with the adhesive tapes 380.

When the side spacers 700 are fixed to the main body 430 of the electrode body 400, as illustrated in FIG. 9, the side spacers 700 extend from one end to the other end of the main body 430 in the winding axis direction. At this time, the bottom plates 730 of the side spacers 700 cover the other end of the main body 430. The bases 710 as one ends of the side spacers 700 are separated from one end of the main body 430 with a predetermined gap S1 in the winding axis direction.

Next, the connection state of the side spacer 700 and each of the lower insulating members 120 and 130 will be described with reference to FIG. 8.

The connection state of the lower insulating member 120 and the side spacer 700 is the same as the connection state of the lower insulating member 130 and the side spacer 700. Thus, the connection state of the lower insulating member 130 and the side spacer 700 will be described below, and the description of the connection state of the lower insulating member 120 and the side spacer 700 is omitted.

As illustrated in FIG. 8, the engaging portion 131 protrudes from one outer end of the lower insulating member 130. Both sides of the engaging portion 131 are provided with respective ribs 133 extending along the whole length of the engaging portion 131. The ribs 133 increase the strength of the entire engaging portion 131. A notch 131a dented in the X-axis direction is provided at the center of the tip of the engaging portion 131. The notch 131a engages with the positioning portion 715 on the top plate 711 of the side spacer 700. Specifically, the notch 131a penetrates in the Z-axis direction and is opened to the positive side of the X-axis direction, and thus, can engage with the positioning portion 715 in the Z-axis direction and the X-axis direction. Engaging the notch 131a with the positioning portion 715 limits the movement of the notch 131a in the direction crossing the Z-axis direction, more specifically, the movement of the notch 131a in the Y-axis direction. That is, the movement of the entire lower insulating member 130 in the Y-axis direction, in turn, the movement of the cover plate structure 180 having the lower insulating member 130 in the Y-axis direction is limited, thereby positioning the cover plate structure 180.

Figure 10:
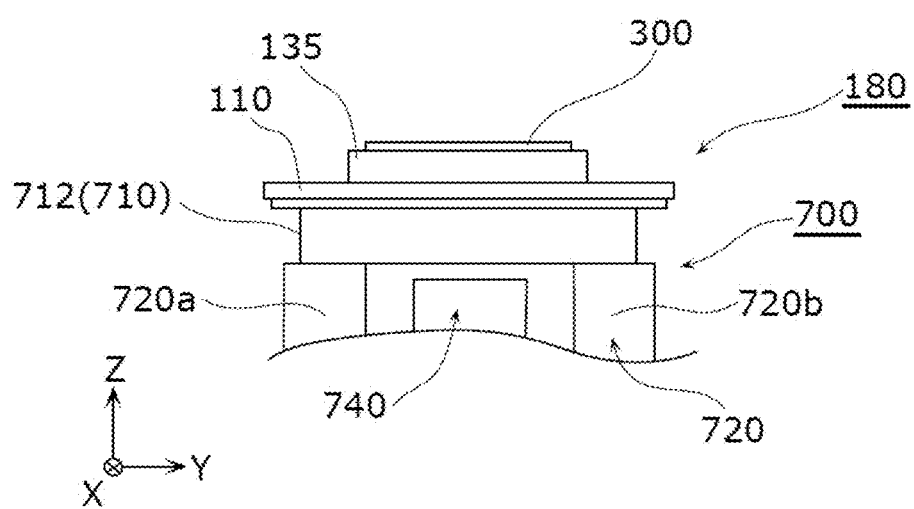
FIG. 10 is a positional relation between the cover plate structure and the side spacer in accordance with the embodiment after positioning.

FIG. 10 is a side view illustrating the positional relation between the cover plate structure 180 and the side spacer 700 in accordance with the embodiment after positioning.

As illustrated in FIG. 10, the base 710 as one end of the side spacer 700 is in contact with the cover plate 110 that is a portion of the cover plate structure 180. Specifically, one end face of the wall portion 712 of the base 710 is in contact with the cover plate 110. Also in this state, as described above, the base 710 is separated from one end of the main body 430 of the electrode body 400 with the predetermined gap S1 in the winding axis direction (See FIG. 6). Therefore, even when the cover plate structure 180 is pressed from above, the pressure is not exerted onto the one end of the main body 430.

Next, the illustrative configuration of the connecting portion between the current collector and the tab via the lead plate will be described with reference to FIG. 11.

Figure 11:
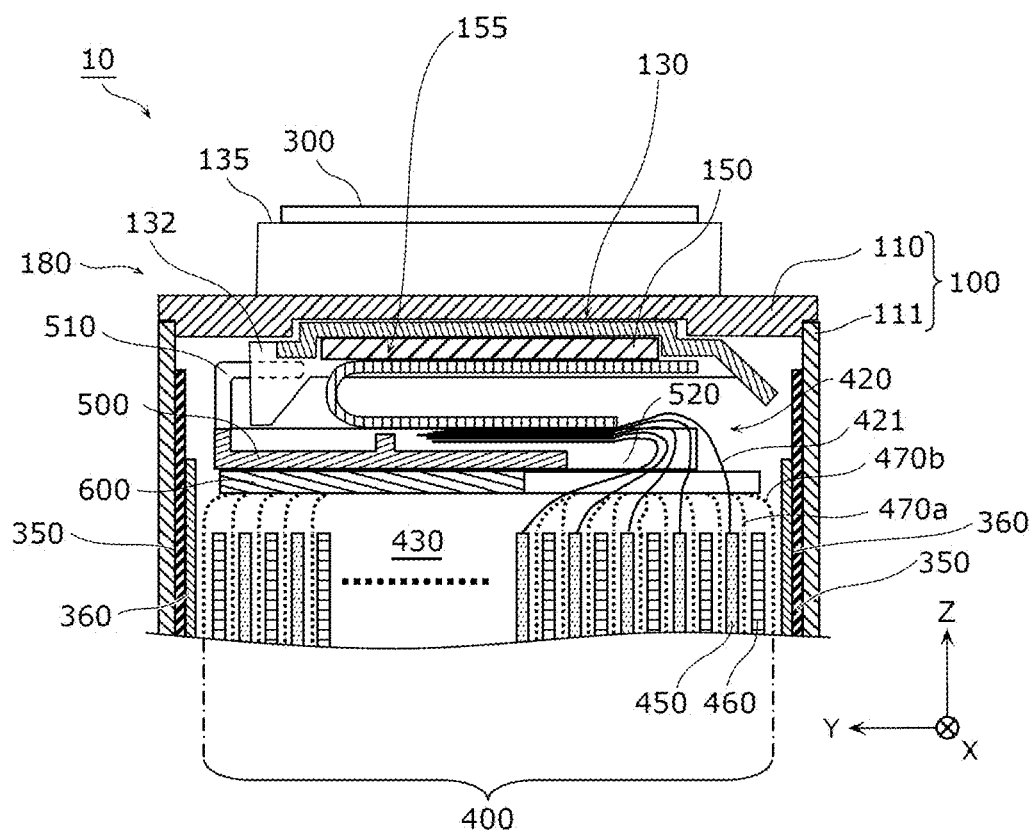
FIG. 11 is a schematic sectional view illustrating the cover plate structure and its surrounding configuration in accordance with the embodiment.

FIG. 11 is a schematic sectional view illustrating the cover plate structure 180 and its surrounding configuration in accordance with the embodiment. FIG. 11 illustrates the cross section of a portion of the energy storage device 10 taken along a YZ plane passing a line XI-XI in FIG. 3, and the side spacer 700 on the positive side of the X-axis direction (See FIG. 2) is omitted. The electrode body 400 is simplified in this figure.

As illustrated in FIG. 11, the tab 420 of the electrode body 400 is electrically connected to the negative electrode current collector 150 via the negative electrode lead plate 155 having the U-shaped cross section. Such connecting structure is produced by a following procedure, for example.

An end (first end) of the flat negative electrode lead plate 155 is bonded to the tab 420 of the electrode body 400 by, for example, ultrasonic welding. Then, an end (second end) opposite to the first end of the negative electrode lead plate 155 is bonded to the negative electrode current collector 150 integrated into the cover plate structure 180 by, for example, laser welding. After that, the negative electrode lead plate 155 is bent at a predetermined position between the first end and the second end to be deformed into a U shape. This, as illustrated in FIG. 11, results in the connecting structure between the tab 420 of the electrode body 400 and the negative electrode current collector 150 via the negative electrode lead plate 155 having the U-shaped cross section.

The upper spacer 500 is disposed between the end of the main body 430 on the side on which the tab 420 is provided, and the cover plate 110. Describing in more detail, the upper spacer 500 separates the bonding portion between the tab 420 and the negative electrode lead plate 155 from the main body 430 of the electrode body 400. The tab 420 is inserted into the inserting portions 520 provided in the upper spacer 500. The cushioning sheet 600 is sandwiched between the upper spacer 500 and the main body 430 of the electrode body 400.

FIG. 11 illustrates the configuration surrounding the negative electrode lead plate 155 and the description thereof is made. The same also applies to the configuration surrounding the positive electrode lead plate 145. That is, the tab 410 of the electrode body 400 is electrically connected to the positive electrode current collector 140 via the positive electrode lead plate 145 having a U-shaped cross section (See, for example, FIG. 2). The upper spacer 500 separates the bonding portion between the tab 410 and the positive electrode lead plate 145 from the main body 430 of the electrode body 400, and the tab 410 is inserted into the inserting portion 520 provided in the upper spacer 500.

By connecting the electrode body 400 to the positive electrode current collector 140 and the negative electrode current collector 150 via the positive electrode lead plate 145 and the negative electrode lead plate 155, respectively, in this manner, the length of the tabs 410 and 420 of the electrode body 400 (length in the winding axis direction (Z-axis direction)) can be made smaller.

That is, the width of the electrode plates of the positive electrode 450 and the negative electrode 460 (length in the winding axis direction (Z-axis direction)), which is required to manufacture the electrode body 400, can be made smaller. This is advantageous for the manufacturing efficiency of the electrode body 400.

As illustrated in FIG. 11, a binding sheet 360 is disposed between the main body 430 of the electrode body 400 and the insulating sheet 350.

Figure 12:
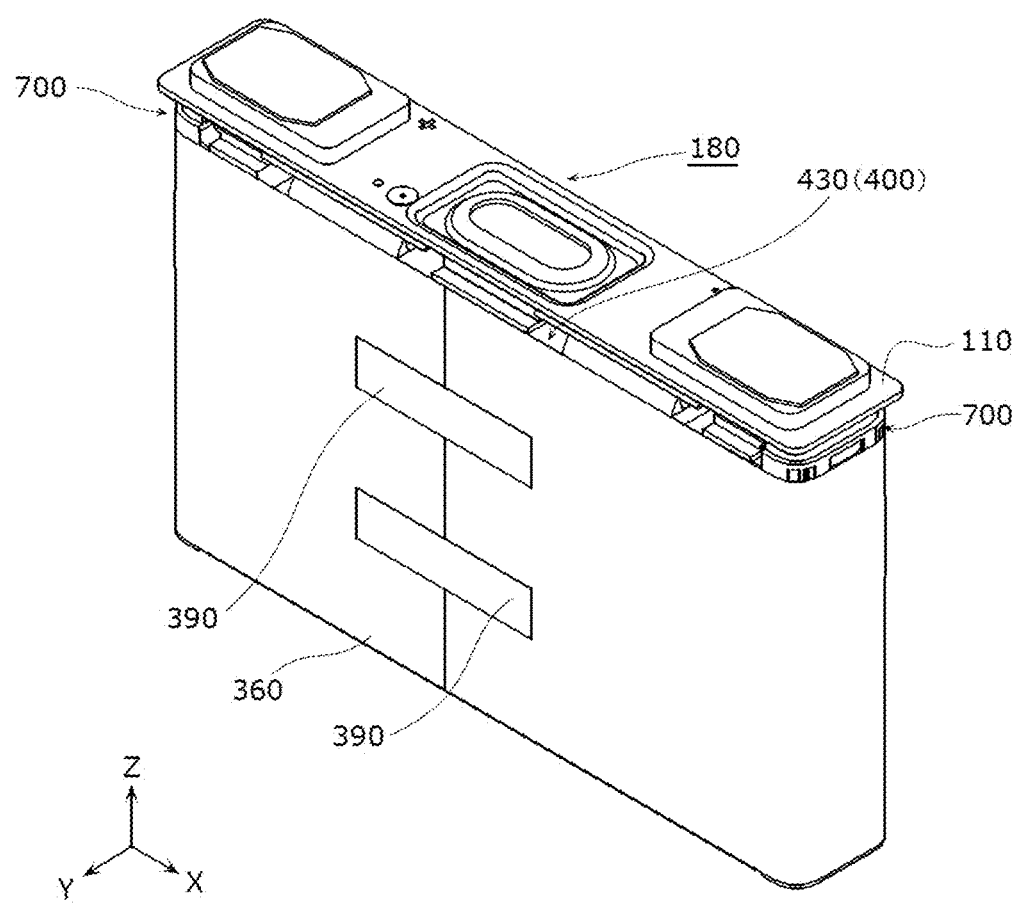
FIG. 12 is a perspective view illustrating the binding state of a binding sheet to the electrode body in accordance with the embodiment.

FIG. 12 is a perspective view illustrating the binding state of the binding sheet 360 to the electrode body 400 in accordance with the embodiment.

As illustrated in FIG. 12, the binding sheet 360 is wound around the main body 430 of the electrode body 400. Specifically, the binding sheet 360 is a band-like member for stabilizing the shape of the main body 430, and is wound around the outer circumference of the main body 430. One end of the binding sheet 360 overlaps the other end, and the ends are fixed to each other with adhesive tapes 390. The ends of the binding sheet 360 may be fixed to each other with an adhesive, or by thermal welding, without using the adhesive tapes 390. An annular binding member may be used. The binding sheet 360 is made of an insulating material having resistance to electrolyte solution. Specific examples of the insulating material include PC, PP, PE, and PPS. The step of winding the binding sheet 360 around the main body 430 may be omitted when the shape of the main body 430 is stabilized.

The adhesive tapes 370, 380, and 390 are made of an insulating material with a substrate having resistance to electrolyte solution. Specific examples of the insulating material include PC, PP, PE, and PPS. Adhesive layers formed on one faces of the substrates of the adhesive tapes 370 and 380 are made of an adhesive having resistance to electrolyte solution and insulating property.

Next, a method for manufacturing the energy storage device 10 will be described.

First, the tab 410 of the electrode body 400 is welded to a flat plate that will become the positive electrode lead plate 145, and the tab 420 of the electrode body 400 is welded to a flat plate that will become the negative electrode lead plate 155. Then, following assembling of the cover plate structure 180, the flat plate that will become the positive electrode lead plate 145 is welded to the positive electrode current collector 140 of the cover plate structure 180, and the flat plate that will become the negative electrode lead plate 155 is welded to the negative electrode current collector 150. After welding, the flat plate that will become the positive electrode lead plate 145 and the flat plate that will become the negative electrode lead plate 155 each are bent to form the positive electrode lead plate 145 and the negative electrode lead plate 155, respectively.

Next, the side spacers 700 are attached to the main body 430 of the electrode body 400. Specifically, as illustrated in FIG. 7, the side spacer 700 is attached to each of the curved portions 431 and 432 of the main body 430. On the side of the curved portion 431, the positioning portion 715 of the side spacer 700 is engaged with the engaging portion 121 of the lower insulating member 120 that is a portion of the cover plate structure 180 to position them and then, the side spacer 700 is fixed to the main body 430 with the adhesive tapes 380. Similarly, on the side of the curved portion 432, the side spacer 700 is fixed to the main body 430 with the adhesive tapes 380. After fixation, as illustrated in FIG. 10, the cover plate 110 that is a portion of the cover plate structure 180 is in contact with the base 710 that is one end of the side spacer 700.

Subsequently, as illustrated in FIG. 12, the binding sheet 360 is wound around the main body 430 of the electrode body 400, and the ends of the binding sheet 360 are fixed to each other with the adhesive tapes 390.

Figure 13:
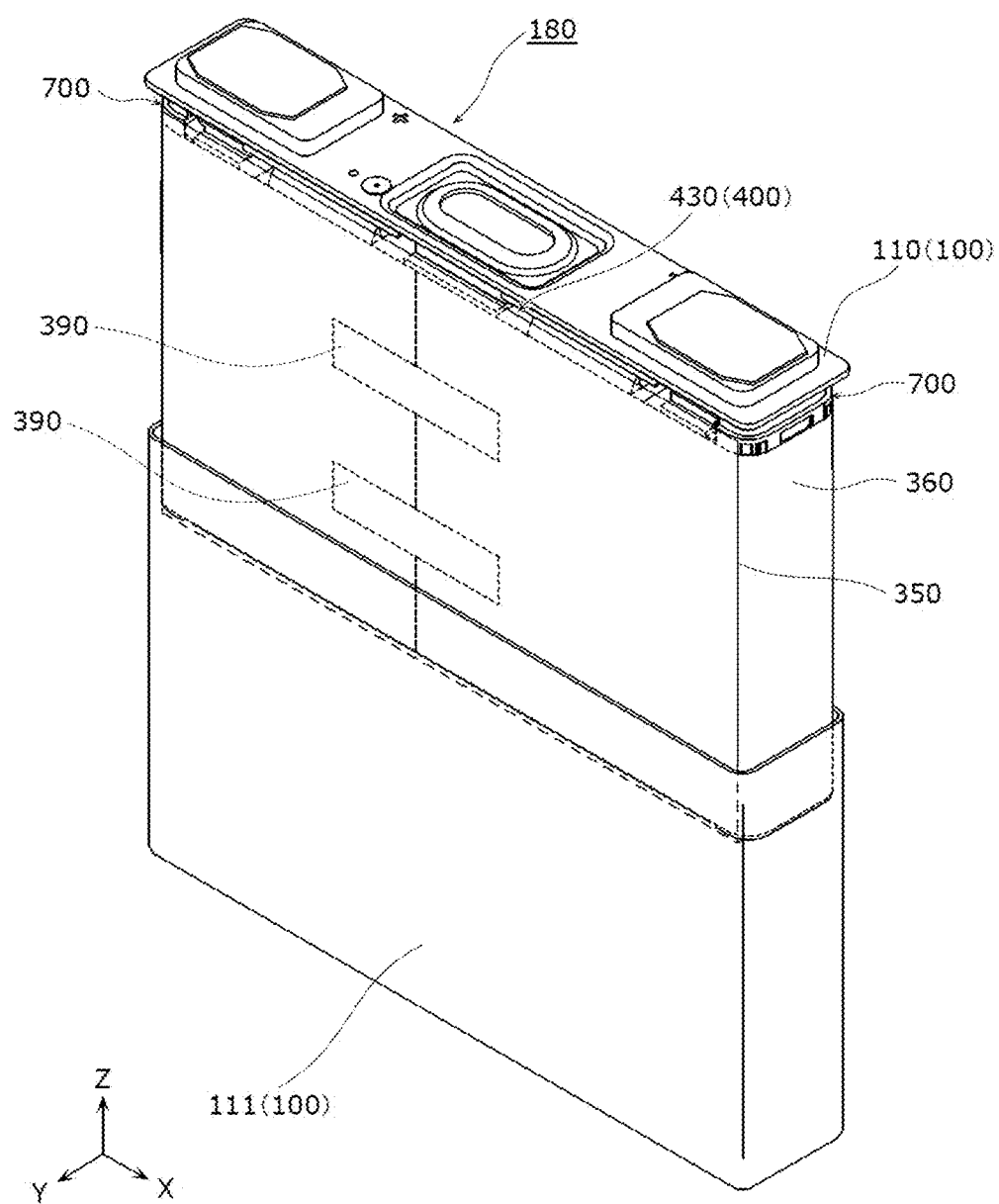
FIG. 13 is a perspective view illustrating one step of a method for manufacturing the energy storage device in accordance with the embodiment.

FIG. 13 is a perspective view illustrating one step of a method for manufacturing the energy storage device 10 in accordance with the embodiment.

As illustrated in FIG. 13, the electrode body 400 around which the binding sheet 360 is wound is stored in the main body 111 of the case 100.

Then, as illustrated in FIG. 10, since the bases 710 of the side spacers 700 contact the cover plate 110 of the cover plate structure 180, when the cover plate structure 180 is pressed, the side spacers 700 and the electrode body 400 moves toward the inside of the main body 111 of the case 100. During the movement, the side spacers 700 slide along the inner circumferential face of the main body 111, smoothly guiding the electrode body 400 into the main body 111.

Figure 14:
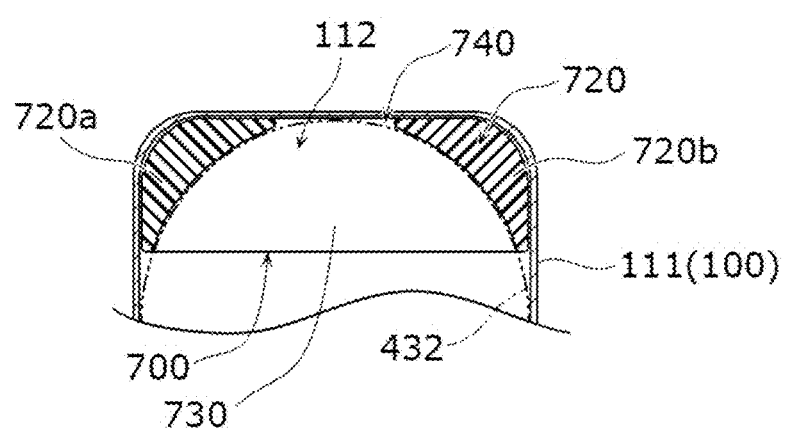
FIG. 14 is a sectional view illustrating the positional relation between the side spacer, the electrode body, and the case in accordance with the embodiment.
Figure 14:
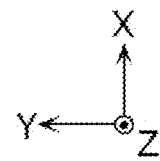

FIG. 14 is a sectional view illustrating the positional relation between the side spacers 700, the electrode body 400, and the case 100 in accordance with the embodiment. In FIG. 14, the outer shape of the curved portion 432 of the main body 430 of the electrode body 400 is expressed by a two-dot chain line.

As illustrated in FIG. 14, the side spacer 700 is disposed along the side face forming the short side of the storage recess 112 when viewed in the winding axis direction. The inner face of the storage recess 112 has round-shaped corners. Since the outer face of the wall body 720 of the side spacer 700 is a smooth convex curved face that corresponds to the round shape, the side spacer 700 is in close contact with the main body 111 to stably hold the electrode body 400. The curved portion 432 of the electrode body 400 is disposed in the opening 740 of the side spacer 700 such that a portion of the face of the curved portion 432 is flush with the outer face of the wall body 720. Thereby, the main body 430 of the electrode body 400 can be stored tightly in the main body 111 while using the side spacers 700. When the electrode body 400 and so on are stored in the main body 111 of the case 100, one end of the main body 430 of the electrode body 400 is opposed to the cover plate structure 180.

After that, the cover plate 110 is welded to the main body 111 to assemble the case 100.

Subsequently, electrolyte solution is filled through the electrolyte solution filling port 117 and then, the electrolyte solution filling plug 118 is welded to the cover plate 110 to close the electrolyte solution filling port 117, thereby producing the energy storage device 10.

As described above, in accordance with this embodiment, since the opening 740 of the side spacers 700 exposes a portion of the faces of the curved portions 431 and 432 of the electrode body 400 from one end to the other end of the electrode body 400 in the winding axis direction, the main body 430 of the electrode body 400 can be disposed in the opening 740. Consequently, the space for the electrode body 400 can be extended, and the outer shape of the electrode body 400 can be increased without upsizing the entire energy storage device 10, to increase the capacity.

Since the portion of the face of the electrode body 400, which is exposed through the opening 740, is flush with the outer face of the side spacer 700, the entire opening 740 can be used as the space for the electrode body 400. Consequently, the capacity of the energy storage device 10 can be increased.

The side spacer 700 is provided on each of the two curved portions 431 and 432 of the electrode body 400 and thus, can be produced with simple structure.

The electrode body 400 is disposed such that its one end in the winding axis direction is opposed to the cover plate 110. Such so-called laterally-wound electrode body 400 can increase the capacity. The side spacers 700 are disposed between the case 100 and the electrode body 400 so as to cross the principal face of the cover plate 110 and thus, can be used as guides when the electrode body 400 is stored in the case 100, smoothly guiding the electrode body 400 into the case 100.

Since the side spacer 700 is disposed along the side face forming the short side of the storage recess 112, as compared to the case where the side spacer 700 is disposed along the side face forming the long side of the storage recess 112, the side spacer 700 can be reduced in size. Consequently, the larger space for electrode body 400 can be ensured, enlarging the outer shape of the electrode body 400.

Since the portion of the faces of the curved portions 431 and 432, which is exposed through the opening 740, includes the apexes of the curved portions 431 and 432, the portion of the faces of the curved portions can be readily disposed in the opening 740.

Other Embodiments

The energy storage device in accordance with the present invention has been described with reference to the embodiment. However, the present invention is not limited to the above embodiment. Various modifications of the embodiment and any combination of the above-mentioned components that could be devised by those skilled in the art fall within the scope of the present invention, unless they are deviated from the subject matter of the present invention.

For example, the number of electrode body 400 of the energy storage device 10 is not limited to one, and may be two or more. When the energy storage device 10 has the plurality of electrode bodies 400, as compared to the case where one electrode body 400 is stored in the case 100 having the same volume, dead space at corners of the case 100 can be reduced. In turn, the ratio of the electrode body 400 in the volume of the case 100 can be increased to increase the capacity of the energy storage device 10.

The positional relation between the tab 410 on the positive electrode side and the tab 420 on the negative electrode side in the electrode body 400 is not specifically limited. For example, in the wound-type electrode body 400, the tab 410 may be opposed to the tab 420 in the winding axis direction. When the energy storage device 10 has the stacked-type electrode body, the tab on the positive electrode side and the tab on the negative electrode side may protrude in different directions when viewed in the stacking direction.

The side spacers 700 may be modified in any shape as long as it enables the curved portions 431 and 432 to be exposed from one end to the other end of the electrode body 400 in the winding axis direction. For example, in the above embodiment, the side spacers 700 each are integrated with the curved portions 431 and 432 of the electrode body 400. However, the side spacers may be divided.

Figure 15:
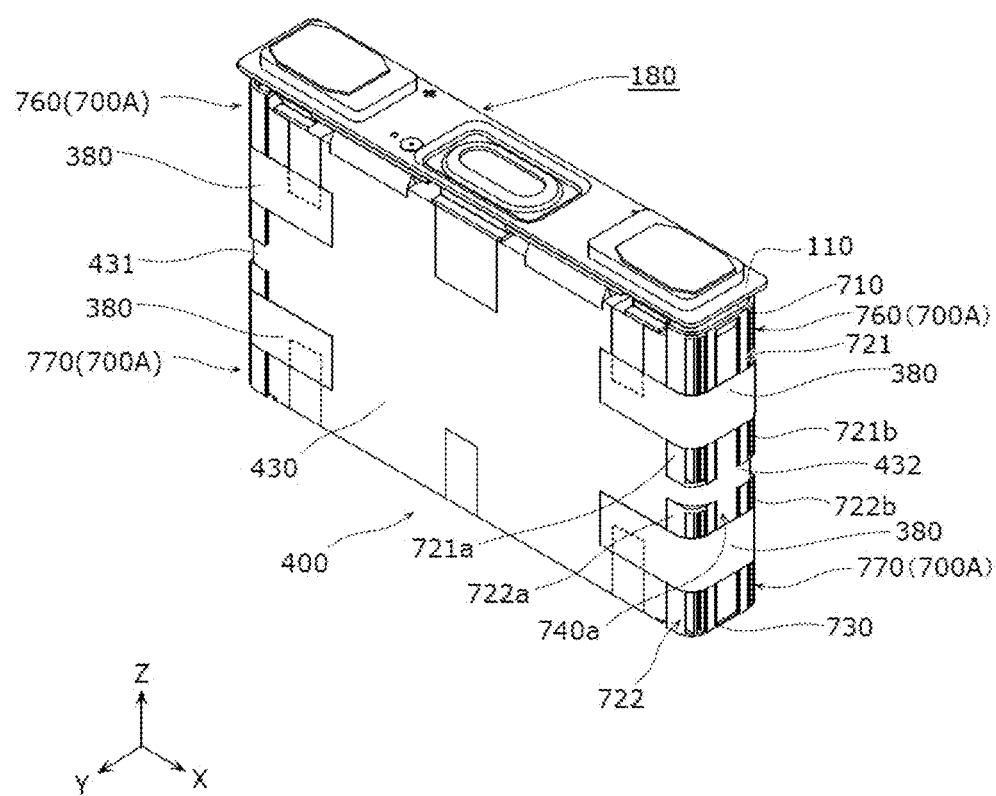
FIG. 15 is a perspective view illustrating the state where side spacers in a modification example of the embodiment are attached to the electrode body.

FIG. 15 is a perspective view illustrating the state where the side spacers in the modification example of the embodiment are attached to the electrode body 400.

In following description, the same elements as those in the embodiment are given the same reference numerals, and description thereof may be omitted.

As illustrated in FIG. 15, a side spacer 700A is formed by dividing the side spacer 700 in accordance with the embodiment at the substantially center in the Z-axis direction, and includes a first member 760 and a second member 770. The first member 760 has a base 710 and a wall body 721. The second member 770 has a bottom plate 730 and a wall body 722. The wall body 721 of the first member 760 is separated from the wall body 722 of the second member 770 with a predetermined distance in the Z-axis direction. A slit between the first wall body 721a and the second wall body 721b in the wall body 721, and a slit between the first wall body 722a and the second wall body 722b in the wall body 722 form an opening 740a. Through the opening 740a, a portion of the faces of the curved portions 431 and 432 is exposed from one end to the other end of the electrode body 400 in the winding axis direction.

In the embodiment, the side spacer 700 is provided on each of the curved portions 431 and 432 of the electrode body 400. However, a plurality of side spacers may be integrated.

Figure 16:
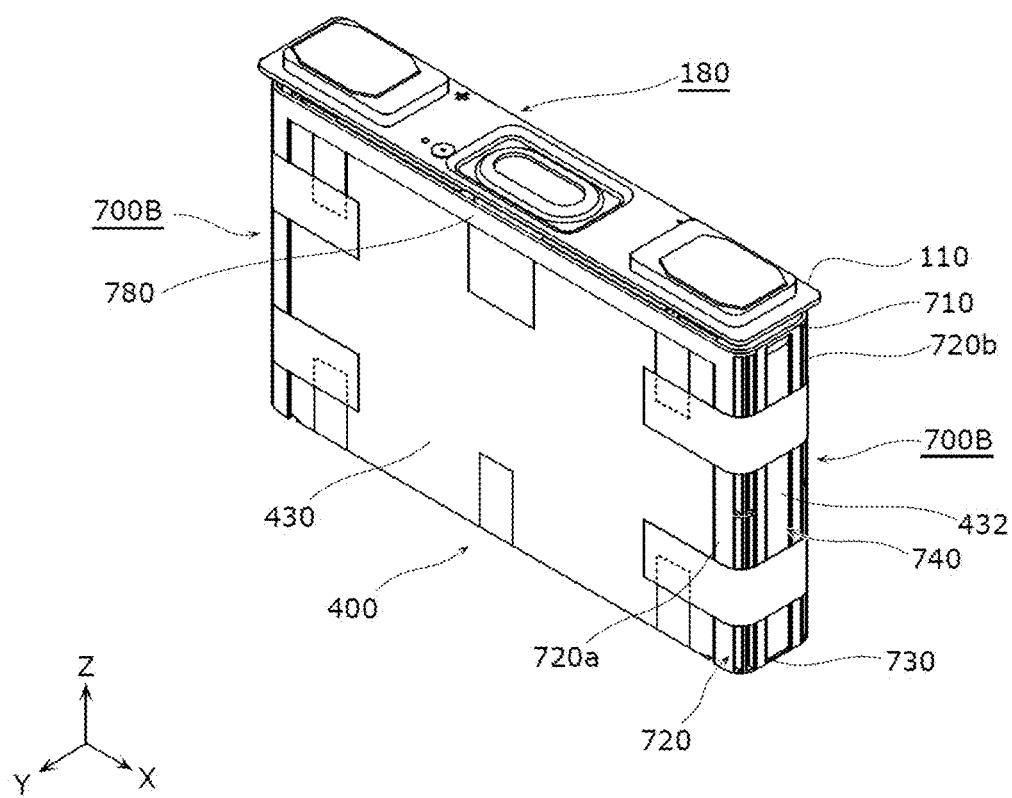
FIG. 16 is a perspective view illustrating the state where side spacers in another modification example of the embodiment are attached to the electrode body.

FIG. 16 is a perspective view illustrating the state where side spacers in another modification example of the embodiment are attached to the electrode body 400.

As illustrated in FIG. 16, side spacers 700B attached to the curved portions 431 and 432 are coupled to and integrated with each other and via a beam 780. Specifically, the beam 780 extends between one ends of the pair of side spacers 700B in the X-axis direction. The beam 780 may be installed at any position that does not greatly reduce the capacity of the electrode body 400. The pair of side spacers 700B are integrated with each other via the beam 780 in this manner, increasing the stiffness and simplifying assembling.

In the embodiment, the outer face of the wall body 720 of the side spacer 700 is a smooth convex curved face. However, the outer face of the wall body 720 may take any shape that conforms to the inner face of the main body 111 of the case 100.

Figure 17:
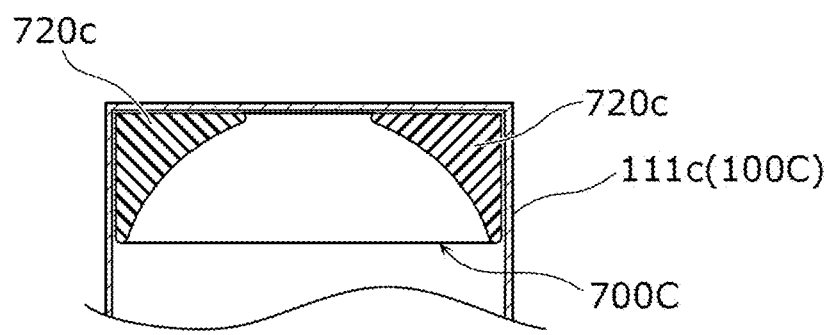
FIG. 17 is a sectional view illustrating the positional relation between a side spacer in another modification example of the embodiment and a case.
Figure 17:
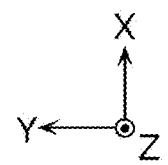

FIG. 17 is a sectional view illustrating the positional relation between the side spacer in another modification example of the embodiment and the case 100.

As illustrated in FIG. 17, a main body 111c of a case 100C has an inner face including substantially square corners. The outer face of a wall body 720c of a side spacer 700C has substantially square corners that conform to the inner face of the main body 111c. Also in this case, the side spacer 700C is in close contact with the main body 111c to stably hold the electrode body 400.

In the embodiment, the cover plate 110 contacts the bases 710 that are one ends of the side spacers 700. However, the base 710 may contact any other portion other than the cover plate 110, as long as it is a portion of the cover plate structure 180, or a member located in the case 100 on the inner side than the cover plate 110 (for example, the lower insulating members 120 and 130, the positive electrode current collector 140, and the negative electrode current collector 150).

In the embodiment, the positioning portion 715 of the side spacer 700 is a front end of the inner wall 714a, and the engaging portion 131 of the cover plate structure 180 has the notch 131a that engages with the positioning portion 715. However, the positioning portion 715 and the engaging portion 131 may have any shape as long as they can engage with each other for positioning. For example, the positioning portion 715 may be formed as a boss protruding in the Z-axis direction, and the engaging portion 131 has a hole into which the boss can be inserted. In this case, the movement in the Y-axis direction as well as the movement in the X-axis direction can be limited.

In the embodiment, a portion of the face of the curved portions 431 and 432 in the electrode body 400 is flush with the outer face of the side spacer 700. However, the portion of the face of the curved portions 431 and 432 only needs to be disposed at least in the opening 740. Also in this case, since a space for the electrode body 400 can be extended into the opening 740, as compared to the case where no opening 740 is provided, the outer shape of the electrode body 400 can become larger.

In the embodiment, the energy storage device 10 includes the insulating sheet 350 and the binding sheet 360. However, the insulating sheet 350 and the binding sheet 360 are not essential.

Any combination of the embodiment and the modification examples falls within the scope of the present invention.

INDUSTRIAL APPLICABILITY

The present invention can be applied to energy storage devices such as a lithium ion secondary battery.

DESCRIPTION OF REFERENCE SIGNS 10 energy storage device
100, 100C case
110 cover plate
110a through hole
110b through hole
111, 111c main body
112 storage recess
113 bottom
117 electrolyte solution filling port
118 electrolyte solution filling plug
120, 130 lower insulating member
120a, 130a through hole
120b, 130b engaging projection
121, 131 engaging portion
122, 132 attachment portion
125, 135 upper insulating member
125a, 126, 135a, 140a, 150a through hole
131a notch
133 rib
140 positive electrode current collector
145 positive electrode lead plate
150 negative electrode current collector
155 negative electrode lead plate
160 expanding portion
170 safety valve
180 cover plate structure
200 positive electrode terminal
210, 310 fastening portion
300 negative electrode terminal
350 insulating sheet
360 binding sheet
370, 380, 390 adhesive tape
400 electrode body
410, 420 tab
411, 421 protruding portion
430 main body
431, 432 curved portion
450 positive electrode
460 negative electrode
470a, 470b separator
470c, 470d protruding portion
500 upper spacer
510 locking portion
520 inserting portion
600 cushioning sheet
700, 700A, 700B, 700C side spacer (spacer)
710 base
711 top plate
712 wall portion
713 circumferential wall
714, 714a, 714b inner wall
715 positioning portion
720, 720c, 721, 722 wall body
720a, 721a, 722a first wall body
720b, 721b, 722b second wall body
730 bottom plate
740, 740a opening
760 first member
770 second member
780 beam

The invention claimed is:

1. An energy storage device, comprising:
an electrode body in which an electrode is wound;
a case configured to store the electrode body; and
a spacer interposed between the case and the electrode body,
wherein the spacer includes an opening extending in a winding axis direction of the electrode body, and
wherein a portion of a face of a curved portion of the electrode body is disposed in the opening, the portion of the face of the curved portion of the electrode body continuously extending from one end to an other end of the electrode body in the winding axis direction of the electrode body.

2. The energy storage device according to claim 1, wherein the portion of the face of the curved portion of the electrode body is flush with an outer face of the spacer.

3. The energy storage device according to claim 1, wherein the electrode body comprises an ellipse including two curved portions, and
wherein spacers each including the spacer are provided on each of the two curved portions.

4. The energy storage device according to claim 1, wherein the electrode body is disposed such that the one end in the winding axis direction of the electrode body is opposed to a cover plate of the case.

5. The energy storage device according to claim 1, wherein the case includes a rectangular storage recess when viewed in the winding axis direction, and
wherein the spacer is disposed along a side face forming a short side of the rectangular storage recess.

6. The energy storage device according to claim 1, wherein the portion of the face of the curved portion of the electrode body includes an apex of the curved portion.

7. The energy storage device according to claim 1, wherein the winding axis direction of the electrode body is perpendicular to a longitudinal direction of an extension of the electrode body.

8. The energy storage device according to claim 1, wherein the portion of the face of the curved portion of the electrode body is exposed from the opening.

9. The energy storage device according to claim 1, wherein the portion of the face of the curved portion of the electrode body penetrates into the opening.

10. The energy storage device according to claim 1, wherein the case comprises a short side surface and a long side surface, which is longer than the short side surface, and wherein, along the short side surface, the portion of the face of the curved portion of the electrode body continuously extends from the one end to the other end of the electrode body in the winding axis direction of the electrode body.

11. The energy storage device according to claim 10, wherein, along the short side surface, the portion of the face of the curved portion of the electrode body is exposed from the opening.

12. An energy storage device, comprising:

an electrode body in which an electrode is wound;

a case configured to store the electrode body; and a spacer interposed between the case and the electrode body, wherein the spacer includes an opening configured to expose a portion of a face of a curved portion of the electrode body, the portion of the face of the curved portion of the electrode body continuously extending from one end to an other end of the electrode body in a winding axis direction of the electrode body.

13. The energy storage device according to claim 12, wherein the portion of the face of the curved portion of the electrode body is exposed from the opening.

14. The energy storage device according to claim 12, wherein the portion of the face of the curved portion of the electrode body penetrates into the opening.

15. An energy storage device, comprising:

an electrode body in which an electrode is wound;

a case configured to store the electrode body; and a spacer interposed between the case and the electrode body, wherein the spacer includes an opening configured to expose a portion of a face of a curved portion of the electrode body from one end to an other end of the electrode body in a winding axis direction of the electrode body, wherein the electrode body includes a main body and positive and negative tab portions protruding from one end of the main body in the winding axis direction of the electrode body, and wherein the portion of the face of the curved portion of the electrode body continuously extends from the one end to the other end of the electrode body in the winding axis direction of the electrode body.

16. The energy storage device according to claim 15, wherein the portion of the face of the curved portion of the electrode body penetrates the opening.

\* \* \* \* \*